United States Patent [19]
Higuchi

[11] Patent Number: 6,142,494
[45] Date of Patent: Nov. 7, 2000

[54] SUSPENSION SYSTEM FOR VEHICLE

[75] Inventor: Akira Higuchi, Shizuoka-ken, Japan

[73] Assignee: Toyota Jidosha Kabushiki Kaisha, Toyota, Japan

[21] Appl. No.: 09/121,821

[22] Filed: Jul. 24, 1998

[30] Foreign Application Priority Data

Aug. 4, 1997 [JP] Japan .................................. 9-209279

[51] Int. Cl.[7] ...................................................... B62D 7/16
[52] U.S. Cl. .............................. 280/93.51; 280/124.135; 280/124.106
[58] Field of Search ..................... 280/124.143, 124.135, 280/124.145, 124.15, 124.106, 124.107, 93.502, 93.51, 98, FOR 147, FOR 124, FOR 126

[56] References Cited

U.S. PATENT DOCUMENTS

| | | | |
|---|---|---|---|
| 1,169,468 | 1/1916 | Devanney | 280/93.51 |
| 1,556,531 | 10/1925 | McMillin | 280/124.106 |
| 2,071,577 | 2/1937 | Renwick et al. | 280/124.135 |
| 2,961,253 | 11/1960 | Allison | 280/124.106 |
| 4,436,175 | 3/1984 | Watanabe et al. | 280/124.145 |
| 4,787,645 | 11/1988 | Ohbayashi et al. | 280/124.136 |
| 4,799,703 | 1/1989 | Mueller et al. | 280/124.135 |
| 5,158,320 | 10/1992 | Ando et al. | 280/124.142 |
| 5,324,056 | 6/1994 | Orton | 280/124.106 |
| 5,505,479 | 4/1996 | Lee | 280/124.107 |

FOREIGN PATENT DOCUMENTS

| | | |
|---|---|---|
| 0 319 931 A1 | 6/1989 | European Pat. Off. . |
| 41 35 928 A1 | 5/1993 | Germany . |
| 43 41 559 A1 | 6/1994 | Germany . |
| 58-209606 | 12/1983 | Japan . |
| 2-92711 | 4/1990 | Japan . |
| 3-224808 | 10/1991 | Japan ........................ 280/47 |

*Primary Examiner*—Paul N. Dickson
*Assistant Examiner*—Lynda Jasmin
*Attorney, Agent, or Firm*—Oliff & Berridge, PLC

[57] ABSTRACT

First arms are coupled through suspension member and second arms are coupled through first link members and second link member. Further, a swinging arm supported at one end thereof through ball joint on the body is supported in a swingable state by support shafts.

3 Claims, 10 Drawing Sheets

SUSPENSION SYSTEM FOR VEHICLE

BACKGROUND OF THE INVENTION

1. Field of the Invention

The present invention relates to a suspension system for vehicle mounted on a vehicle.

2. Related Background Art

The suspension systems for vehicle conventionally known include independent suspensions, for example, such as a dual link type McPherson strut suspension (Japanese Laid-open Patent Application No. 58-209606 etc.). The general structure of this suspension has, as shown in FIG. 15, a lower arm composed of two suspension arms 401, 402 spaced in the longitudinal direction of the vehicle, and a strut rod 403 extending forward, and a steer angle of wheel is restricted by these two suspension arms 401, 402. Since the left and right suspensions support the respective wheels independently of each other, the vertical motion of one wheel will not affect the other wheel.

SUMMARY OF THE INVENTION

Rolling of the vehicle causes so-called roll steer, change in the steer angles. In the independent suspensions as described above, the wheels move independently of each other relative to the vehicle, and steer angles of each wheel vary according to stroke amounts of each wheel independently of each other. Since during rolling of the body the vertical motion of the left and right wheels is mainly in opposite phases, the opposite-phase strokes are utilized to largely change the steer angles of one wheel, thereby enhancing controllability and stability of the vehicle.

In the case of the independent suspensions, however, when the left and right wheels vertically move in phase with roll angles of the vehicle being constant, the steer angles of the both wheels will change together according to the vertical motion thereof. There were cases where the change affected the controllability and stability of the vehicle.

The present invention has been accomplished in order to solve this problem and an object of the invention is to provide a suspension system for vehicle that can suppress the variation in the steer angles of the both wheels well when the vertical motion of the left and right wheels is strokes in phase and that can change the steer angles adequately when the vertical motion is strokes in opposite phases.

A suspension system for vehicle, as set forth in the first, comprises wheel support members provided for respective wheels located on either side of a vehicle, each of the wheel support members supporting an associated wheel; first arms and second arms, one end of each of the arms being connected to the wheel support member, the first arm and second arm being spaced along the longitudinal direction of the vehicle; a first support member which is supported in a laterally displaceable state on a body of the vehicle and to which other ends of the respective first arms located on either side are connected in a swingable state; a second support member supported in a swingable state on the body and connected to the first support member; and link means for connecting the second support member with each of the second arms located on either side thereof; wherein the link means comprises: first link members whose connecting portions with the respective second arms are supported on the body and which translationally move in conjunction with swinging motion of the second arms about the connecting portions, and a second link member connecting the first link members with each other, a middle part of this connection of the second link member being supported so as to be rotatable relative to the second support member.

The link means composes a so-called Watt link mechanism, in which when the left and right wheels vertically move with strokes in phase with each other, the two first link members translationally move in opposite directions to each other so as to approach and leave each other and in which the second link rotates relative to the second support member in conjunction with the translational motion. This absorbs the translational motion of the two first link members to adequately suppress displacement of the first support member and the second support member, so that variation is suppressed well in the steer angles of the two wheels.

To the contrary, when the left and right wheels vertically move with strokes in opposite phases to each other, the Watt link mechanism does not work because the two first link members are displaced in the same direction. Thus, the second support member swings relative to the body in conjunction with the translational motion of the first link members. The first support member is displaced along the lateral direction of the vehicle in conjunction with this swinging motion of the second support member, whereby this motion is transmitted through the first arms to the wheel support members on the both sides, thus steering the wheels in a predetermined direction.

A suspension system for vehicle, as set forth in the second, comprises wheel support members provided for respective wheels located on either side of a vehicle, each of the wheel support members supporting an associated wheel; first arms, each of which has a connecting portion connected to each wheel support member and a support portion supported on a body of the vehicle, each first arm swinging about the support portion in conjunction with vertical motion of the wheel support member; a first support member supported so as to be swingable relative to the body, in connecting portions to which the respective first arms located on either side are connected each in a swingable state and in a pivot portion pivoted on the body at a position spaced along the longitudinal direction of the vehicle from the connecting portions; a second support member spaced in the vertical direction of the vehicle from a swinging axis of the first support member and connected to the first support member, the second support member being supported in a laterally displaceable state on the body; and second arms disposed on either side of the second support member, one end of each second arm being connected to the second support member, and the other end of each second arm being connected to the wheel support member located opposite thereto.

When the left and right wheels vertically move with strokes in phase with each other, the both first arms swing in phase with each other and the first support member swings about the lateral axis of the vehicle passing the pivot portion in synchronism therewith. This adequately suppresses the displacement of the second support member along the lateral direction of the vehicle, so that the variation can be suppressed well in the steer angles of the both wheels.

In contrast with it, when the left and right wheels vertically move with strokes in opposite phases to each other, the both first arms swing in opposite phases to each other, and in synchronism therewith the first support member swings about the swinging axis extending along the longitudinal direction of the vehicle while passing the pivot portion. Since the second support member is spaced in the vertical direction of the vehicle from the swinging axis of the first support member, the second support member is displaced along the lateral direction of the vehicle in conjunction with the motion of this swinging first support member, and this motion is transmitted through the second arms to the wheel support members on the both sides, thus steering the wheels in a predetermined direction.

A suspension system for vehicle, as set forth in the third, comprises wheel support members provided for respective wheels located on either side of a vehicle, each of the wheel support members supporting an associated wheel; first arms, each of which has a connecting portion connected to each wheel support member and a support portion supported on a body of the vehicle, each first arm swinging about the support portion in conjunction with vertical motion of the wheel support member; second arms spaced in the longitudinal direction of the vehicle from the respective first arms, one end of each second arm being connected to the wheel support member; a first support member which is supported in a laterally displaceable state on the body of the vehicle and to which other ends of the second arms located on either side are connected in a swingable state; and a second support member having connecting portions to which the respective first arms located on either side are connected each in a swingable state, and a support portion supported in a swingable state about the longitudinal axis of the vehicle on the first support member; wherein the support portion of the second support member is spaced in the vertical direction of the vehicle from a swinging axis of the second support member.

When the left and right wheels vertically move with strokes in phase with each other, the both first arms swing in phase with each other and the second support member swings about the lateral axis of the vehicle passing the support portion in synchronism therewith. This adequately suppresses the displacement of the first support member along the lateral direction of the vehicle, so that the variation can be suppressed well in the steer angles of the both wheels.

In contrast with it, when the left and right wheels vertically move with strokes in opposite phases to each other, the both first arms swing in opposite phases to each other, and in synchronism therewith the second support member swings about the swinging axis extending along the longitudinal direction of the vehicle while passing the support portion. Since the first support member is spaced in the vertical direction of the vehicle from the swinging axis of the second support member, the first support member is displaced along the lateral direction of the vehicle in conjunction with the motion of the swinging second support member, and this motion is transmitted through the second arms to the wheel support members on the both sides, thus steering the wheels in a predetermined direction.

DETAILED DESCRIPTION OF THE PREFERRED EMBODIMENTS

Each of the embodiments of the present invention will be described by reference to the accompanying drawings.

Figure 1A:
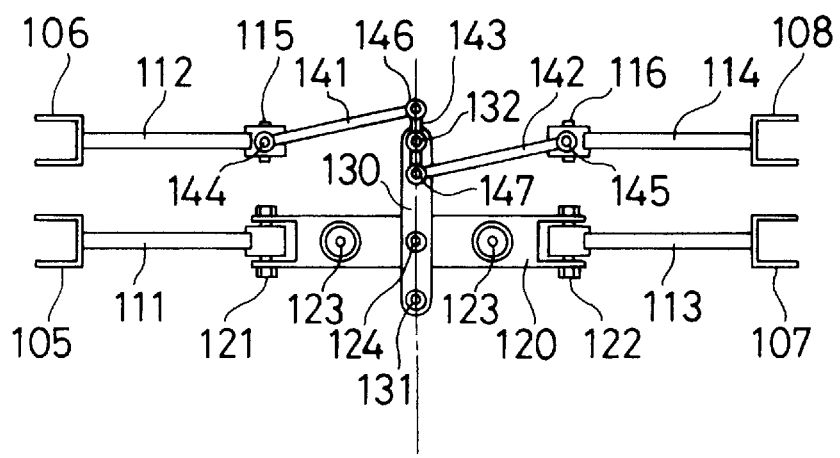
FIG. 1A is a top plan view to show the suspension system for vehicle of the first embodiment.
Figure 1B:
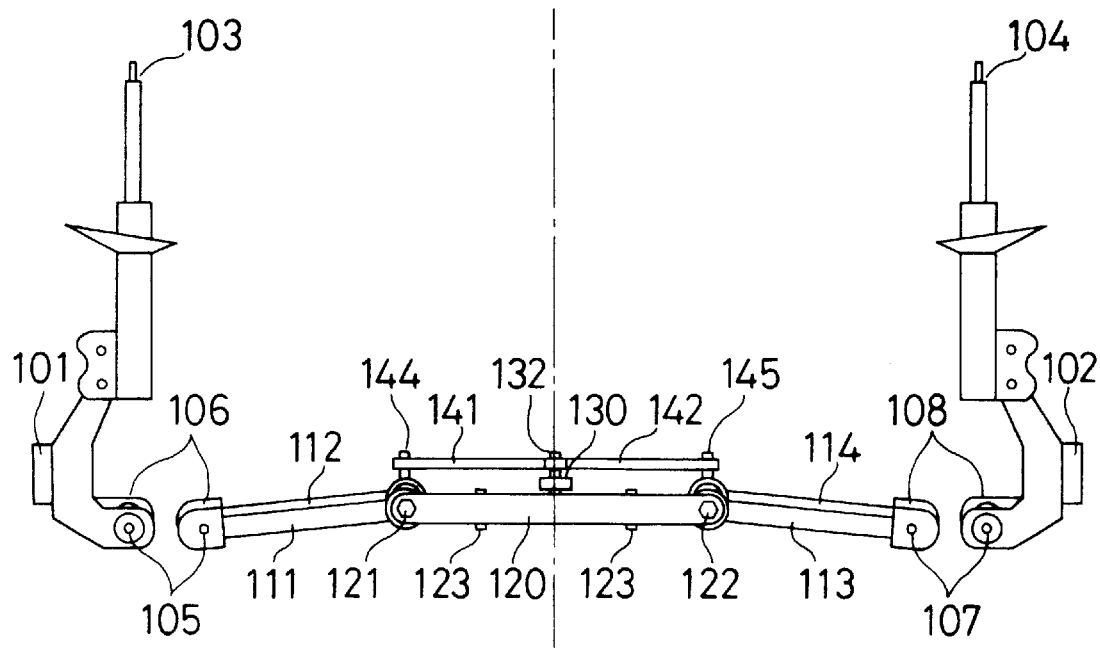
FIG. 1B is a front elevation of the suspension system of FIG. 1A.
Figure 2:
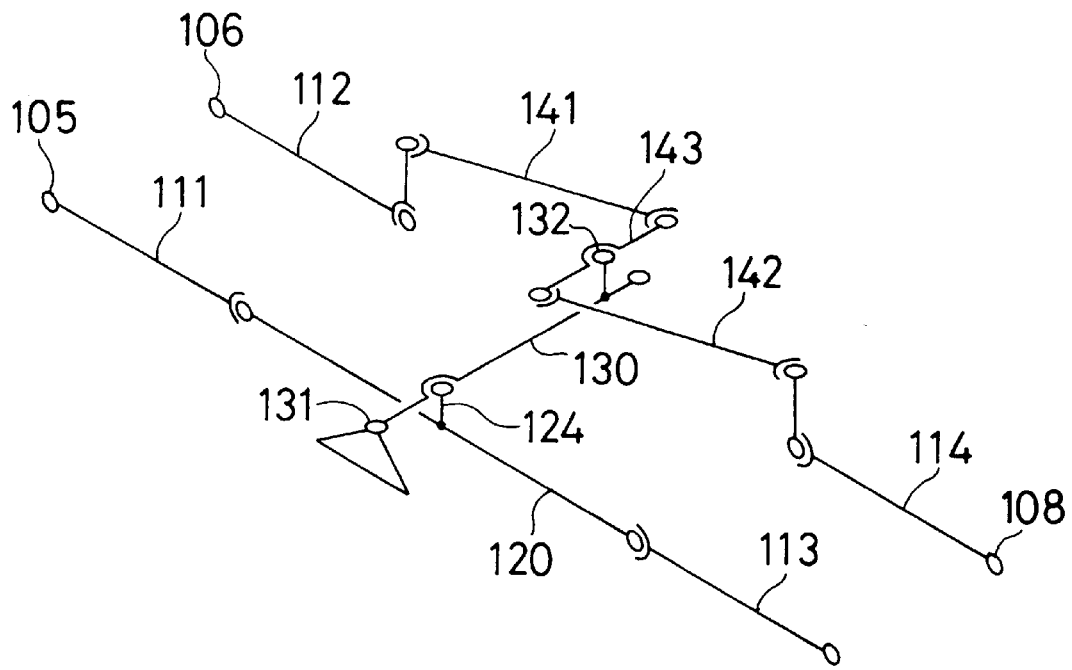
FIG. 2 is a skeleton diagram to schematically show the structure of the suspension system for vehicle of FIGS. 1A and 1B.

A suspension system for vehicle (hereinafter referred to as a suspension) according to the first embodiment is illustrated in FIGS. 1A and 1B and FIG. 2. This suspension composes a dual link type McPherson strut suspension system, in which one end of shock absorber 103, 104 is connected to each wheel support member 101, 102 separately supporting the left or right wheel. Ends of first arm 111 and second arm 112 spaced in the longitudinal direction of the vehicle are connected through a rubber bushing to respective joint portions 105, 106 at the bottom end of the left wheel support member 101, whereby the first arm 111 and second arm 112 are swingable relative to the wheel support member 101 about the joint portion 105, 106. Similarly, ends of first arm 113 and second arm 114 spaced in the longitudinal direction of the vehicle are also connected through a rubber bushing to respective joint portions 107, 108 at the bottom end of the right wheel support member 102, whereby the first arm 113 and second arm 114 are swingable relative to the wheel support member 102 about the joint portion 107, 108.

The other ends of the first arms 111, 113 are respectively connected to the both ends of suspension member 120 through connecting shaft 121, 122, so that the suspension member 120 is swingable relative to the first arms 111, 113 about the connecting shafts 121, 122, respectively. This suspension member 120 is elastically supported through rubber bushings 123 on the body, whereby the suspension member 120 is in a support state elastic mainly in directions along the lateral direction of the vehicle on the body.

A swinging arm 130 is disposed above the suspension member 120 and one end of this swinging arm 130 is supported in a swingable state through ball joint 131 on the body. The middle part of the swinging arm 130 is rotatably connected to the suspension member 120 by support shaft 124 projecting upward therefrom. Further, a support shaft 132 projects at the other end of the swinging arm 130, and this support shaft 132 is connected through a so-called Watt link mechanism with the opposed ends of the second arms 112, 114 located on either side thereof.

This Watt link mechanism is composed of first link members 141, 142, one end of each of which is connected to the second arm 112, 114, and a second link member 143 connecting the opposed ends of the first link members 141, 142 with each other. The first link members 141, 142 are coupled each in a swingable state through ball joint 146, 147 with the second link member 143, and the central part of the second link member 143 is supported so as to be rotatable about the support shaft 132 of the swinging arm 130.

Figure 3:
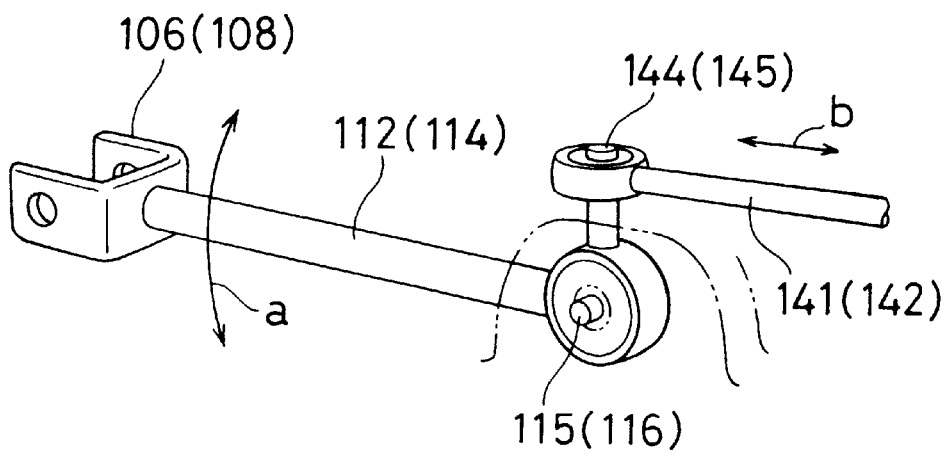
FIG. 3 is a perspective view as an enlarged view of the joint part between the second arm and the first link member.

The second arm 112, 114 has a near L-shape bent upwardly of the vehicle on the other end side, as shown in the enlarged view of FIG. 3, and the bent portion is supported in a swingable state by support shaft 115, 116 supported on the body. The first link member 141, 142 is coupled through ball joint 144, 145 with the end of the second arm 112, 114 projecting upward as described. When the second arm 112, 114 swings along the arrow a of FIG. 3 about the support shaft 115, 116, the first link member 141, 142 translationally moves along the arrow b of FIG. 3 in conjunction with the swinging motion.

The operation of the suspension constructed as described above will be described below.

Figure 4A:
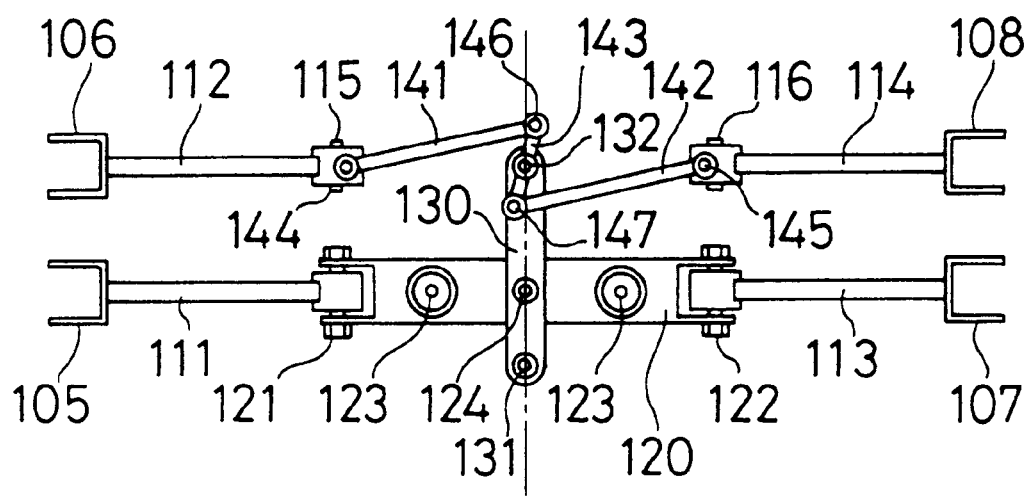
FIG. 4A is a top plan view of the suspension system to show an operating state with strokes in phase.
Figure 4B:
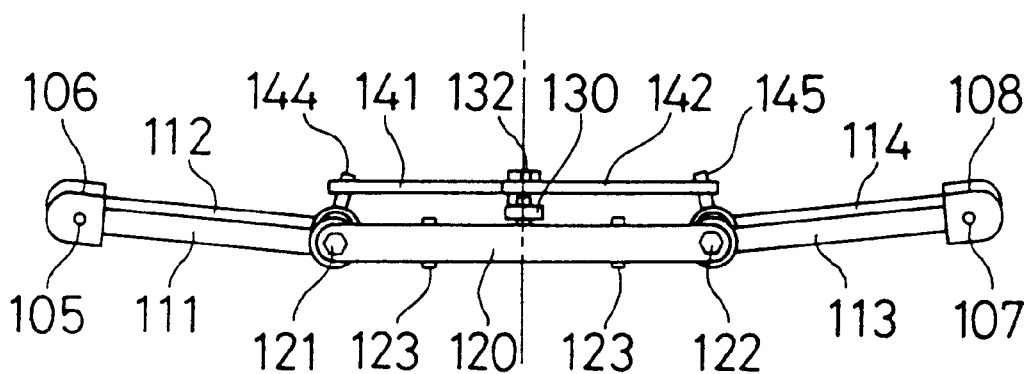
FIG. 4B is a front elevation of the suspension system of FIG. 4A.

When the left and right wheels vertically move with respective strokes in phase with each other (or simultaneously move up and down) as shown in FIGS. 4A and 4B, the first arms 111, 113 swing in phase with each other about the connecting shaft 121, 122. Similarly, the second arms 112, 114 also swing about the support shaft 115, 116, and in conjunction with this motion the both first link members 141, 142 translationally move in opposite directions to each other so as to repetitively approach and leave each other. In conjunction with this motion, the second link member 143 rotates about the support shaft 132. The Watt link mechanism works in this way to fully absorb the translational motion of the first link members 141, 142, whereby swinging motion of the swinging arm 130 is also suppressed well and whereby displacement of the suspension member 120 along the lateral direction of the vehicle is also suppressed well. This results in adequately preventing the variation in the steer angles of the left and right wheels supported by the wheel support members 101, 102.

Figure 5A:
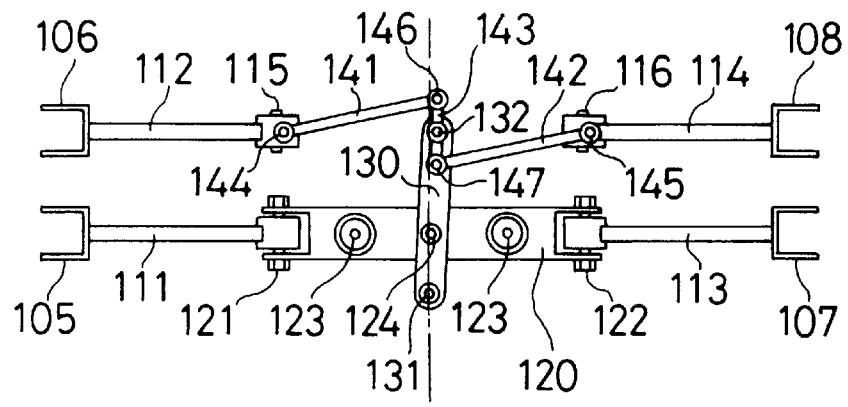
FIG. 5A is a top plan view of the suspension system to show an operating state with strokes in opposite phases.
Figure 5B:
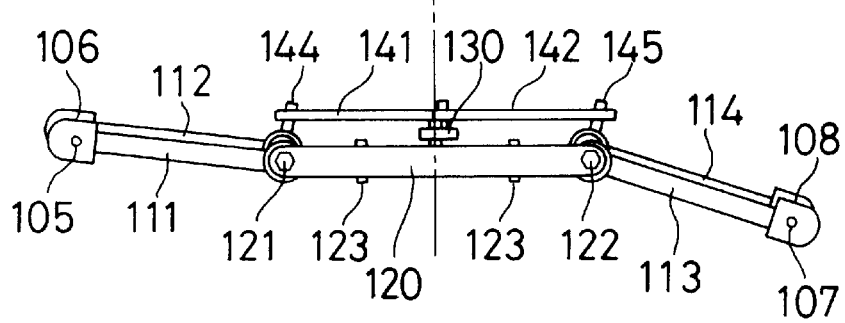
FIG. 5B is a front elevation of the suspension system of FIG. 5A.

In contrast with it, when the left and right wheels vertically move with respective strokes in opposite phases to each other (one moving up while the other moving down) as shown in FIGS. 5A and 5B, the first arms 111, 113 swing in opposite phases to each other about the connecting shaft 121, 122. Similarly, the second arms 112, 114 also swing in opposite phases to each other about the support shaft 115, 116, but in conjunction with this motion the both first link members 141, 142 translationally move so as to be displaced in the same direction. In this case, the Watt link mechanism does not work, and the position of the support shaft 132 is displaced with the translational motion of the first link members 141, 142, so that the swinging arm 130 swings left and right about the ball joint 131. In conjunction with this swinging motion of the swinging arm 130, the suspension member 120 is displaced along the lateral direction of the vehicle, and this motion is transmitted through the first arms 111, 113 to the both wheel support members 101, 102, thus steering the wheels in a predetermined direction.

Figure 6:
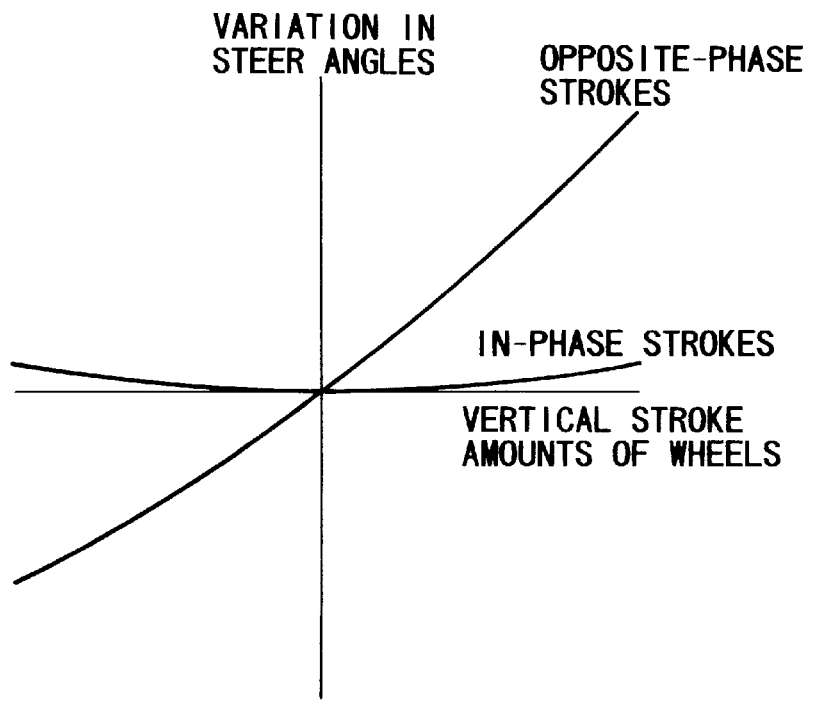
FIG. 6 is a graph to show the relation between stroke amount of wheel and change in steer angles with strokes in phase and with strokes in opposite phases.

The relation between in the in-phase strokes and in the opposite-phase strokes as described is illustrated in the graph of FIG. 6. As shown in this graph, when the left and right wheels are vertically stroked in opposite phases to each other, the steer angles can be changed adequately according to stroke amounts; when the wheels are vertically stroked in phase with each other to the contrary, the variation can be prevented well in the steer angles, as compared with the case of the opposite phase strokes.

A modification of the first embodiment described above can also be constructed by reversing the positional relation between the first arms 111, 113 connected through the suspension member 120 and the second arms 112, 114 connected through the Watt link mechanism, along the longitudinal direction of the vehicle. The vertical placement relation can be determined on an as-needed basis among the suspension member 120, the swinging arm 130, and the Watt link mechanism. Further, the support shaft 124 was positioned between the ball joint 131 and the support shaft 132, but the invention can also employ the structure wherein the ball joint 131 is positioned between the support shaft 132 and the support shaft 124. The above embodiment showed the example wherein the support shaft 132 to be the rotation axis of the Watt link mechanism was set along the vertical direction of the vehicle, but this support shaft 132 can also be set along the longitudinal direction of the vehicle, whereby the Watt link mechanism rotates along a plane normal to the longitudinal direction of the vehicle.

Figure 7A:
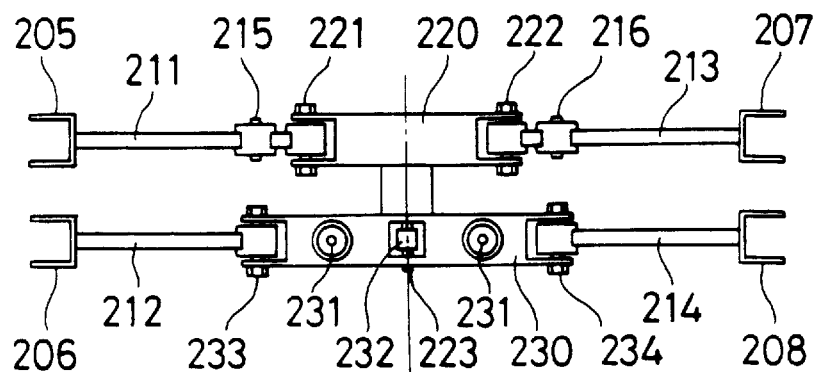
FIG. 7A is a top plan view to show the suspension system for vehicle of the second embodiment.
Figure 7B:
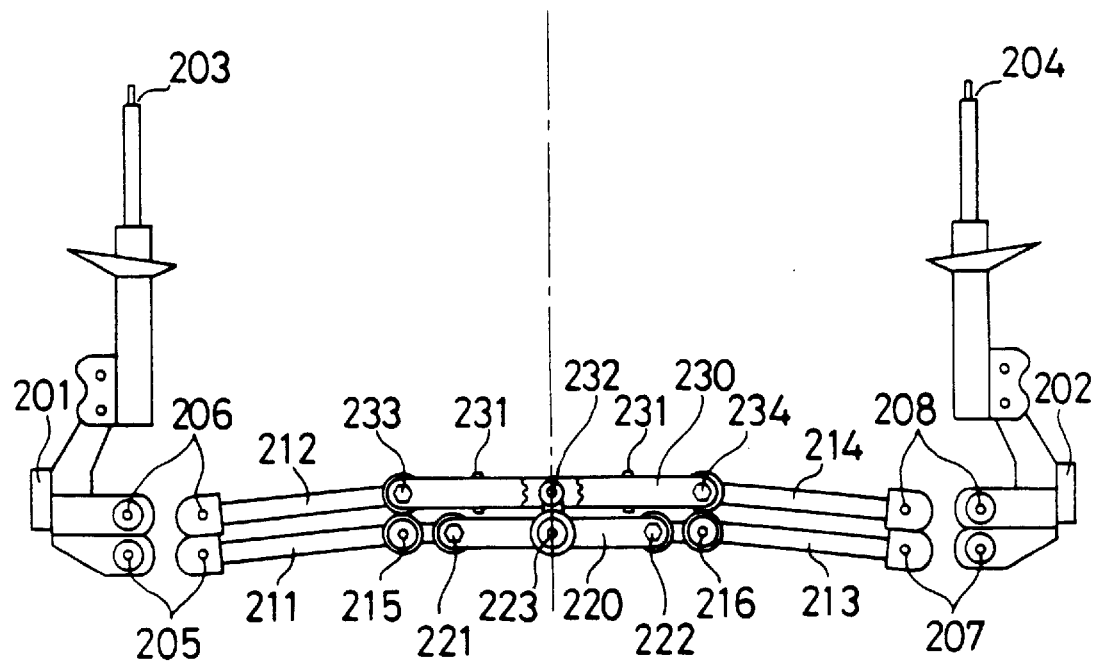
FIG. 7B is a front elevation of the suspension system.
Figure 8:
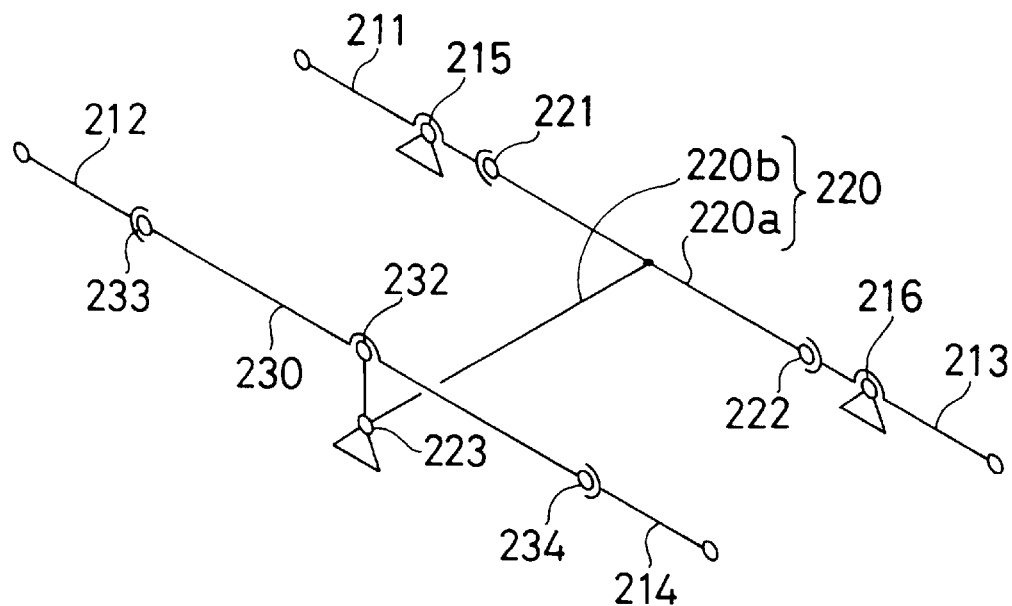
FIG. 8 is a skeleton diagram to schematically show the structure of the suspension system for vehicle of FIGS. 7A and 7B.

A suspension of the second embodiment is illustrated in FIGS. 7A, 7B and 8. This suspension also composes a dual link type McPherson strut suspension system, in which one end of shock absorber 203, 204 is connected to each wheel support member 201, 202 separately supporting the left or right wheel. Ends of first arm 211 and second arm 212 spaced in the longitudinal direction of the vehicle are connected through a rubber bushing to respective joint portions 205, 206 at the bottom end of the left wheel support member 201, so that the first arm 211 and second arm 212 are swingable relative to the wheel support member 201 about the joint portion 205, 206. Similarly, ends of first arm 213 and second arm 214 spaced in the longitudinal direction of the vehicle are also connected through a rubber bushing to respective joint portions 207, 208 at the bottom end of the right wheel support member 202, so that the first arm 213 and second arm 214 are swingable relative to the wheel support member 202 about the joint portion 207, 208.

The other ends of the first arms 211, 213 are connected each through connecting shaft 221, 222 to the both ends of one suspension member 220, so that the suspension member 220 is swingable relative to the first arms 211, 213 about the respective connecting shafts 221, 222. The middle part of the first arm 211, 213 is supported in a rotatable state through rubber bushing 215, 216 on the body.

The suspension member 220 has a near T-shape composed of a part 220a extending in the lateral direction of the vehicle and a part 220b extending in the longitudinal direction of the vehicle (see FIG. 8), and the dead end of the part 220b is bent upwardly of the vehicle. This bent point is pivoted through rubber bushing 223 fixed on the body. The rubber bushing 223 has such characteristics as to be relatively hard in the lateral direction of the vehicle but relatively soft in the other directions (including the rotational directions). Therefore, the suspension member 220 is supported in a swingable state at the three points of the connecting shafts 221, 222 and the rubber bushing 223 on the body.

Another suspension member 230 is elastically supported through rubber bushings 231 on the body, whereby the suspension member 230 is supported so as to be elastic mainly in directions along the lateral direction of the vehicle on the body. The central part of this suspension member 230 is coupled through ball joint 232 with the dead end of the bent portion of the suspension member 220 described above. The other ends of the second arms 212, 214 are connected through connecting shaft 233, 234 to the both ends of the suspension member 230, so that the suspension member 230 is swingable relative to the second arms 212, 214 about the respective connecting shafts 233, 234.

The operation of the suspension constructed as described above will be described below.

Figure 9A:
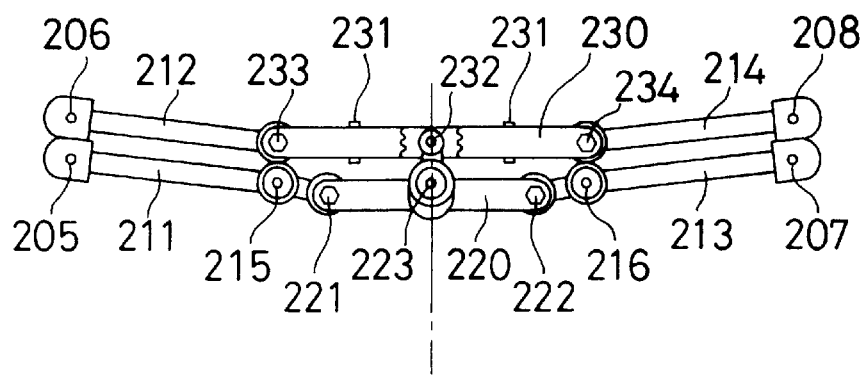
FIG. 9A is a front elevation of the suspension system to show an operating state with strokes in phase.

When the left and right wheels vertically move with respective strokes in phase with each other as shown in FIG. 9A, the second arms 212, 214 swing in phase with each other about the connecting shaft 233, 234 and, similarly, the first arms 211, 213 also swing in phase with each other about the rubber bushing 215, 216. This moves the suspension member 220 connected between the first arms 211, 213 so that the coupling portions thereof with the first arms 211, 213 are displaced substantially vertically relative to the vehicle. The suspension member 220 thus swings about the lateral axis of the vehicle passing the rubber bushing 223. In conjunction with this swinging motion, the suspension member 230 slightly moves only translationally along the longitudinal direction of the vehicle because of elastic deformation of the rubber bushings 231, but experiences little displacement along the lateral direction of the vehicle. As a result, the variation is suppressed well in the steer angles of the left and right wheels supported by the wheel support members 201, 202.

Figure 9B:
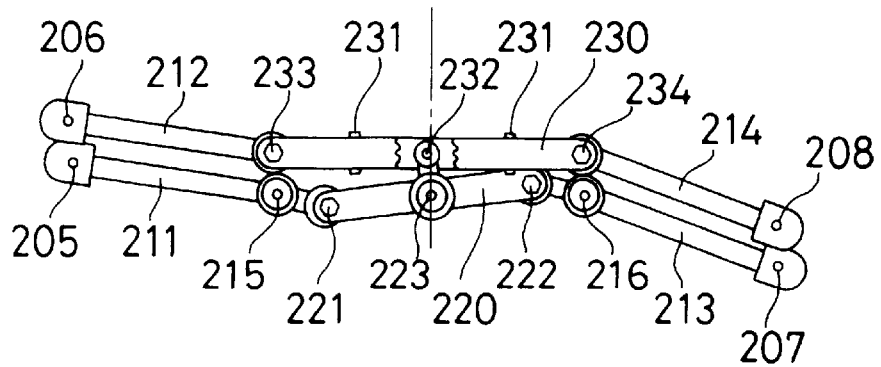
FIG. 9B is a front elevation of the suspension system to show an operating state with strokes in opposite phases.

In contrast, when the left and right wheels vertically move with respective strokes in opposite phases to each other as shown in FIG. 9B, the second arms 212, 214 swing in opposite phases to each other about the connecting shaft 233, 234 and, similarly, the first arms 211, 213 also swing in opposite phases to each other about the rubber bushing 215, 216. This causes the suspension member 220 to rotate about the swinging axis passing the portion 220b, so that the ball joint 232 swings left and right. In conjunction with this swinging motion, the suspension member 230 translationally moves along the lateral direction of the vehicle. On this occasion, the rubber bushings 231 suffer elastic deformation, which allows the translational motion along the lateral direction of the vehicle. This motion is transmitted through the second arms 212, 214 to the both wheel support members 201, 202, thus steering the wheels in the predetermined direction.

When the left and right wheels are vertically stroked in opposite phases by the above motion, the steer angles can be changed adequately according to stroke amounts; when they are vertically stroked in phase with each other to the contrary, the variation can be suppressed well in the steer angles, as compared with the case of the opposite-phase strokes.

Figure 10:
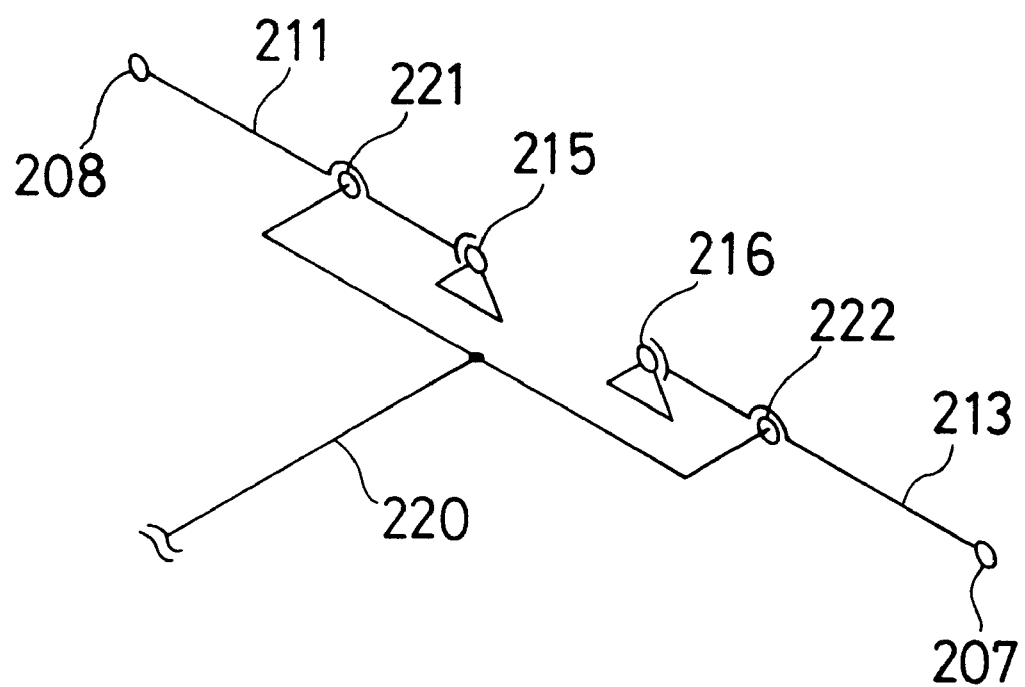
FIG. 10 is a skeleton diagram to show the major part of a modification of the suspension system of the second embodiment.

In a modification of the second embodiment as described above, the positional relation can be reversed, for example, between the rubber bushings 215, 216 and the connecting shafts 221, 222 in the first arms 211, 213, so as to achieve the structure as shown in FIG. 10. The suspension may also be modified so as to reverse the positional relation between the first arms 211, 213 connected through the suspension member 220 and the second arms 212, 214 connected through the suspension member 230 along the longitudinal direction of the vehicle. Further, the suspension can also be modified so as to reverse the vertical positional relation between the suspension member 220 and the suspension member 230.

Figure 11A:
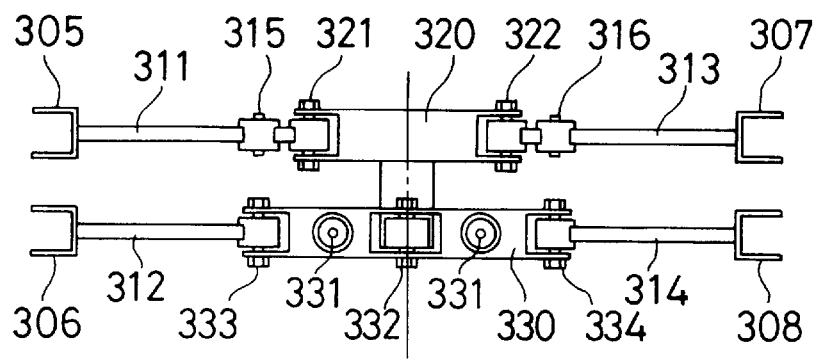
FIG. 11A is a top plan view to show the suspension system for vehicle of the third embodiment.
Figure 11B:
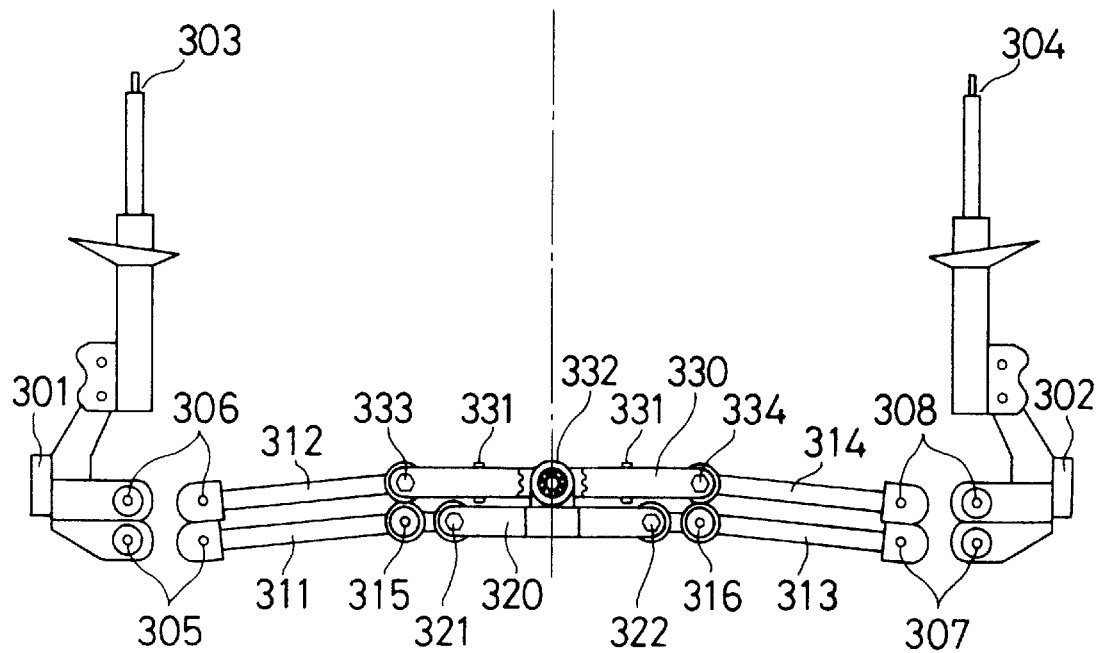
FIG. 11B is a front elevation of the suspension system of FIG. 11A.
Figure 12:
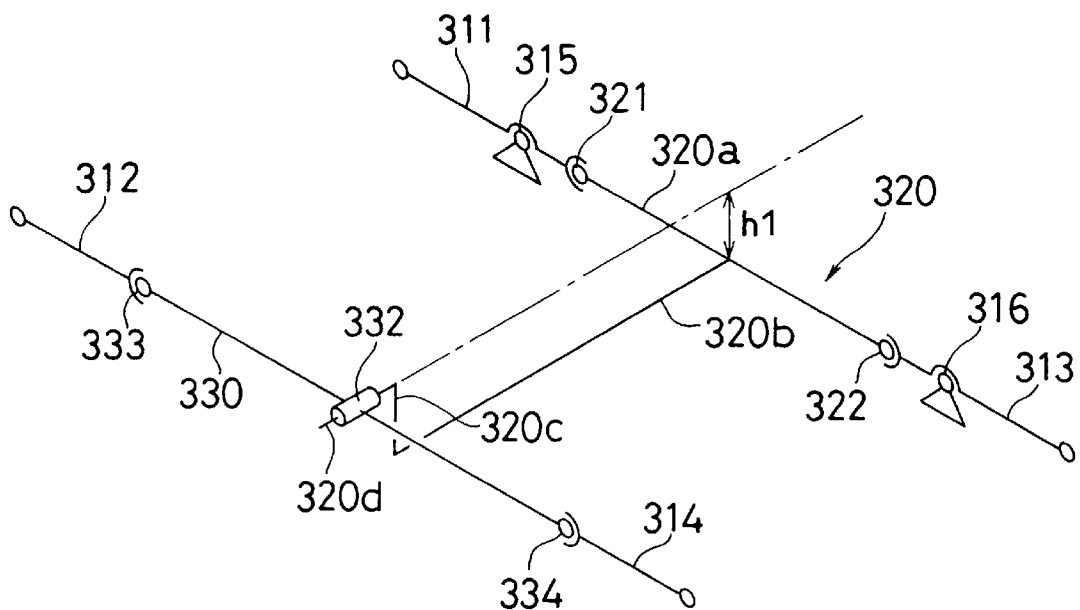
FIG. 12 is a skeleton diagram to schematically show the structure of the suspension system for vehicle of FIGS. 11A and 11B.

A suspension of the third embodiment is illustrated in FIGS. 11A, 11B and 12. This suspension also composes a dual link type McPherson strut suspension system, in which one end of shock absorber 303, 304 is connected to each wheel support member 301, 302 separately supporting the left or right wheel. Ends of first arm 311 and second arm 312 spaced in the longitudinal direction of the vehicle are connected through a rubber bushing to respective joint portions 305, 306 at the bottom end of the left wheel support member 301, so that the first arm 311 and second arm 312 are swingable relative to the wheel support member 301 about the joint portion 305, 306. Similarly, ends of first arm 313 and second arm 314 spaced in the longitudinal direction of the vehicle are also connected through a rubber bushing to respective joint portions 307, 308 at the bottom end of the right wheel support member 302, so that the first arm 313 and second arm 314 are swingable relative to the wheel support member 302 about the joint portion 307, 308.

The other ends of the first arms 311, 313 are connected each through connecting shaft 321, 322 to the both ends of one suspension member 320, so that the suspension member 320 is swingable relative to the first arms 311, 313 about the respective connecting shafts 321, 322. The middle part of the first arm 311, 313 is supported in a rotatable state through rubber bushing 315, 316 on the body.

The suspension member 320 has a near T-shape and is composed of a portion 320a extending in the lateral direction of the vehicle, a portion 320b extending in the longitudinal direction of the vehicle from the central part of this portion 320a, a portion 320c bent upwardly of the vehicle from the portion 320b, and a portion 320d bent in the longitudinal direction of the vehicle from the portion 320c (see FIG. 12). The portion 320d is journaled by rotary joint 332 fixed to another suspension member 330. This rotary joint 332 is located so that the rotation axis thereof is placed along the longitudinal direction of the vehicle and has a difference of h1 in height along the vertical direction of the vehicle from a line connecting the connecting shafts 321, 322. In this way, the rotary joint 332 is in a so-called offset state along the vertical direction of the vehicle with respect to the line connecting the connecting shafts 321, 322.

The suspension member 330 is elastically supported through rubber bushings 331 on the body, whereby the suspension member 330 is supported so as to be elastic mainly in directions along the lateral direction of the vehicle on the body. Ends of the second arms 312, 314 are connected through connecting shaft 333, 334 to the both ends of the suspension member 330, so that the suspension member 330 is swingable relative to the second arms 312, 314 about the respective connecting shafts 333, 334.

The operation of the suspension constructed as described above will be described below.

Figure 13A:
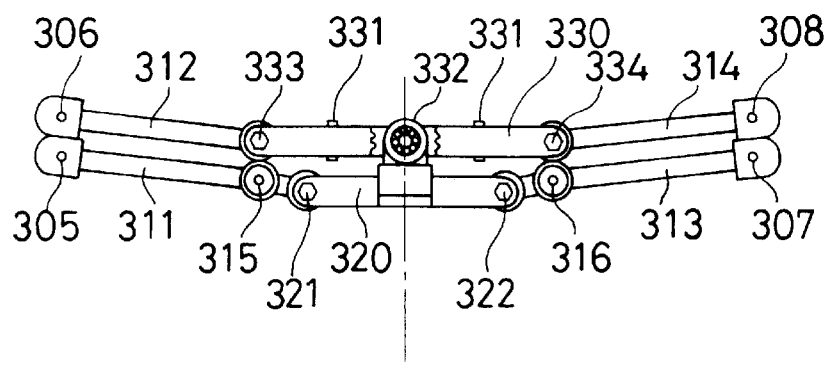
FIG. 13A is a front elevation of the suspension system to show an operating state with strokes in phase.

When the left and right wheels vertically move with respective strokes in phase with each other as shown in FIG. 13A, the second arms 312, 314 swing in phase with each other about the connecting shaft 333, 334 and, similarly, the first arms 311, 313 also swing in phase with each other about the rubber bushing 315, 316. This causes the portion 320*a* of the suspension member 320 connected between the first arms 311, 313 to be displaced nearly vertically relative to the vehicle, so that the suspension member 320 swings about the lateral axis of the vehicle passing the rotary joint 332. In conjunction with this swinging motion, the suspension member 330 slightly moves only translationally along the longitudinal direction of the vehicle because of elastic deformation of the rubber bushings 331, but experiences little displacement along the lateral direction of the vehicle. As a result, the variation is suppressed well in the steer angles of the left and right wheels supported by the wheel support members 301, 302.

Figure 13B:
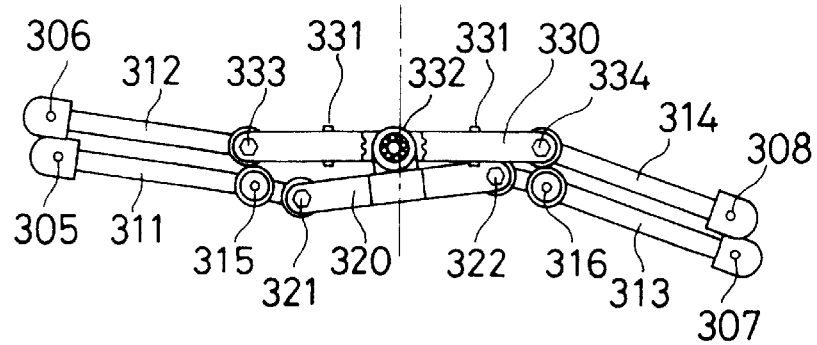
FIG. 13B is a front elevation of the suspension system to show an operating state with strokes in opposite phases.

In contrast, when the left and right wheels vertically move with respective strokes in opposite phases to each other as shown in FIG. 13B, the second arms 312, 314 swing in opposite phases to each other about the connecting shaft 333, 334 and, similarly, the first arms 311, 313 also swing in opposite phases to each other about the rubber bushing 315, 316. This causes the suspension member 320 to swing left and right about the swinging axis passing the portion 320*b*, so that in conjunction with this swinging motion the suspension member 330 translationally moves along the lateral direction of the vehicle. On this occasion, the rubber bushings 331 suffer elastic deformation, which allows the translational motion along the lateral direction of the vehicle. This motion is transmitted through the second arms 312, 314 to the both wheel support members 301, 302, thus steering the wheels in the predetermined direction.

When the left and right wheels are vertically stroked in opposite phases by the above motion, the steer angles can be changed adequately according to stroke amounts; when they are vertically stroked in phase with each other to the contrary, the variation can be suppressed well in the steer angles, as compared with the case of the opposite-phase strokes.

Figure 14:
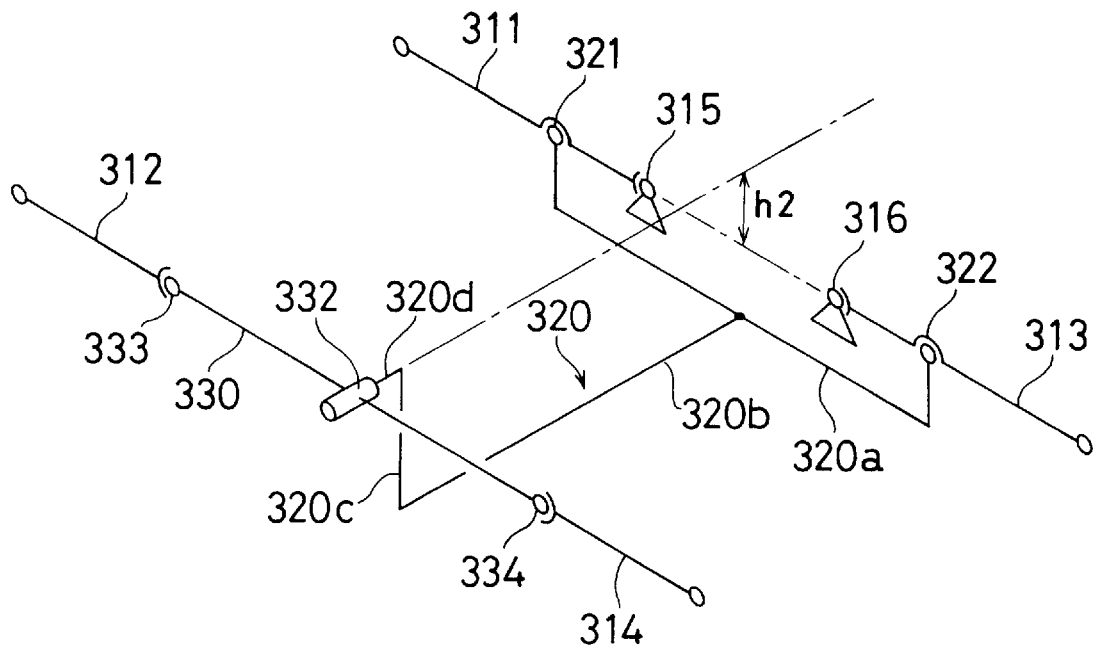
FIG. 14 is a skeleton diagram to show a modification of the third embodiment.
Figure 15:
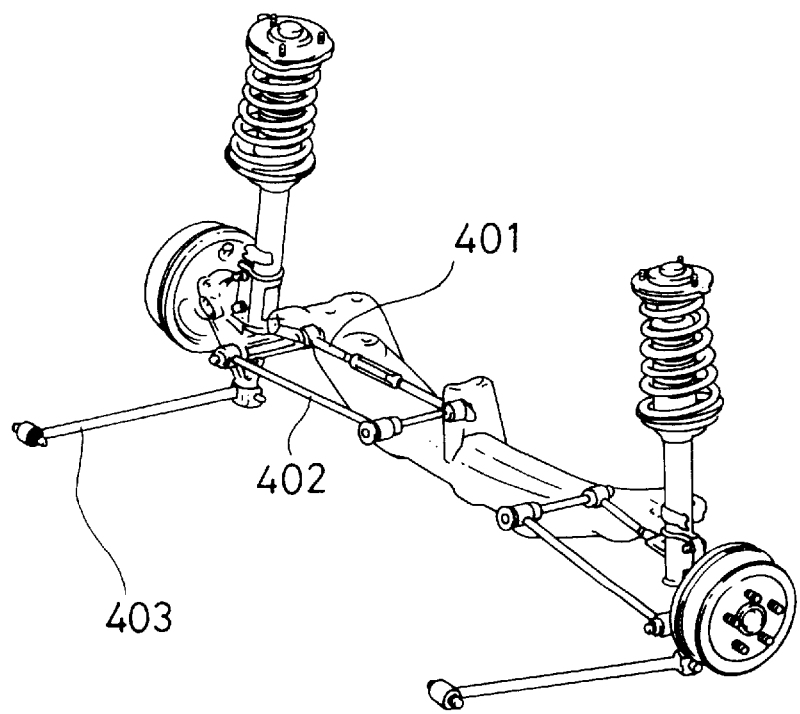
FIG. 15 is a perspective view to show the conventional suspension system for vehicle.

In a modification of the third embodiment as described above, the positional relation can be reversed, for example, between the rubber bushings 315, 316 and the connecting shafts 321, 322 in the first arms 311, 313, so as to achieve the structure as shown in FIG. 14. In this case, the rotary joint 332 is in the offset state by the height h2 along thevertical direction of the vehicle with respect to the line connecting the connecting shafts 321, 322. The suspension may also be modified so as to reverse the positional relation between the first arms 311, 313 connected through the suspension member 320 and the second arms 312, 314 connected through the suspension member 330 along the longitudinal direction of the vehicle. Further, the suspension can also be modified so as to reverse the vertical positional relation between the suspension member 320 and the suspension member 330.

The suspension systems according to the first to third embodiments described above were the examples of application to the McPherson strut suspensions, but the present invention can also be applied to any other suspensions of the type to restrict the steer angles of the wheels by two arms extending substantially along the lateral direction of the vehicle and having joints at the both ends, including the double wishbone suspensions.

In the suspension system for vehicle as set forth in the first, when the vertical motion of the left and right wheels is the strokes in phase with each other, the action of the link means adequately suppresses the displacement of the first support member along the lateral direction of the vehicle; when the vertical motion is the strokes in opposite phases to each other, the action of the link means allows the first support member to be displaced along the lateral direction of the vehicle. This realizes the suspension that can suppress the variation in the steer angles well when the vertical motion of the left and right wheels is the in-phase strokes and that allows large change of the steer angles on the occasion of the opposite-phase strokes.

That is, this suspension system for a vehicle having right and left side wheel support members (102, 101) supporting associated wheels located on either side of the vehicle, comprises: (A) right and left side arm groups, said right side arm group having right side first and second arms (113, 114) each connected at one end to said right side wheel support member (102), said right side first and second arms (113, 114) being spaced along the longitudinal direction of the vehicle, said left side arm group having left side first and second arms (111, 112) each connected at one end to said left side wheel support member (101), said left side first and second arms (111, 112) being spaced along the longitudinal direction of the vehicle; (B) a first central support member (120) located between said right and left side first arms (113, 111), the other end of said right side first arm (113) and said left side first arm (111) being swingably connected to said central support member (120), said central support member (120) being supported in a laterally displaceable state on a body of the vehicle; (C) a second central support member (130) swingably supported on the body and connected to said first central support member (120); (D) a link mechanism located between said right side second arm (114) and said left side second arm (112), connecting said second central support member (130) with the other ends of said right and left side second arms (114, 112), said link mechanism having: first link members (142, 141) having connecting portions which connect with said respective second arms (114, 112), said connecting portions (116, 115) being supported on the body, said first link members (142, 141) moving translationally in conjunction with swinging motion of said second arms (114, 112) about said connecting portions (116, 115) and a second link member (143) connecting said first link members (142, 141) with each other, a middle part of said second link member (143) being supported so as to be rotatable relative to said second central support member (130).

In the suspension system for vehicle as set forth in the second, when the vertical motion of the left and right wheels is the strokes in phase with each other, the first support member swings about the lateral axis of the vehicle, so as to adequately suppress the displacement of the second support member along the lateral direction of the vehicle; when the vertical motion is the strokes in opposite phases to each other, the first support member swings about the longitudinal axis of the vehicle, so as to allow the second support member to be displaced along the lateral direction of the vehicle. This realizes the suspension that can suppress the change in the steer angles well when the vertical motion of the left and right wheels is the in-phase strokes and that allows large change of the steer angles on the occasion of the opposite-phase strokes.

That is, this suspension system for a vehicle having right and left side wheel support members (202, 201) supporting associated wheels located on either side of the vehicle, comprises: (A) right and left side arm groups, said right side arm group having right side first and second arms (213, 214), said left side arm group having left side first and second arms (211, 212) wherein each of said first arms (213, 211)

has: a connecting portion (207, 205) connected to each said wheel support member (202, 201), and a support portion (216, 215) supported on the body of the vehicle, each of said first arms swinging about said support portion (216, 215) in conjunction with vertical motion of said wheel support member (202, 201); (B) a first central support member (230) supported in a laterally displaceable state on a body of the vehicle; and (C) a second central support member (220) swingably supported on the body at a predetermined position (223) and connected to said first central support member (230), said first central support member (230) being spaced in the vertical direction from the predetermined position (223) of said second support member (220), and the predetermined position (223) of said second central support member (220) being spaced along the longitudinal direction of the vehicle from one of connecting portions (222, 221) connected to said first arms (213, 211).

In the suspension system for vehicle as set forth in the third, when the vertical motion of the left and right wheels is the strokes in phase with each other, the first support member swings about the lateral axis of the vehicle, so as to adequately suppress the displacement of the second support member along the lateral direction of the vehicle; when the vertical motion is the strokes in opposite phases to each other, the first support member swings about the longitudinal axis of the vehicle, so as to allow the second support member to be displaced along the lateral direction of the vehicle. This realizes the suspension that can suppress the change in the steer angles well when the vertical motion of the left and right wheels is the in-phase strokes and that allows large change of the steer angles on the occasion of the opposite-phase strokes.

That is, the suspension system for a vehicle having right and left side wheel support members (302, 301) supporting associated wheels located on either side of the vehicle, comprises: (A) right and left side arm groups, said right side arm group having right side first and second arms (313, 314), said left side arm group having left side first and second arms (311, 312), said first arms (313, 311) and second arms (314, 312) being spaced along the longitudinal direction of the vehicle, each of said first arms (313, 311) having a connecting portion (307, 305) connected to each of said wheel support member (302, 301), and a support portion (316, 315) supported on the body of the vehicle, each of said first arms (313, 311) swinging about said support portion (316, 315) in conjunction with vertical motion of said wheel support member (302, 301); (B) a first central support member (330) supported in a laterally displaceable state on a body of the vehicle; and (C) a second central support member (320) located between said first arms (313, 311), swingably supported by said first central support member (330), the axis of swing extending in the longitudinal direction of the vehicle, and connected to said first arms (313, 311), said first arms (313, 311) being swingable related to said second central support member (320) at support portions (322, 321), one of these support portions being spaced in the vertical direction from the axis of swing of said second central support member (320).

I claim:

1. A suspension system for a vehicle having right and left side wheel support members supporting associated wheels located on either side of the vehicle, comprising:

(A) right and left side arm groups, said right side arm group having right side first and second arms each connected at one end to said right side wheel support member, said right side first and second arms being spaced along the longitudinal direction of the vehicle, said left side arm group having left side first and second arms each connected at one end to said left side wheel support member, said left side first and second arms being spaced along the longitudinal direction of the vehicle;

(B) a first central support member located between said right and left side first arms, the other end of said right side first arm and said left side first arm being swingably connected to said central support member, said central support member being supported in a laterally displaceable state on a body of the vehicle;

(C) a second central support member swingably supported on the body and connected to said first central support member;

(D) a link mechanism located between said right side second arm and said left side second arm, connecting said second central support member with the other ends of said right and left side second arms, said link mechanism having:

first link members having connecting portions which connect with said respective second arms, said connecting portions being supported on the body, said first link members moving translationally in conjunction with swinging motion of said second arms about said connecting portions, and a second link member connecting said first link members with each other, a middle part of said second link member being supported so as to be rotatable relative to said second central support member.

2. A suspension system for a vehicle having right and left side wheel support members supporting associated wheels located on either side of the vehicle, comprising:

(A) right and left side arm groups, said right side arm group having right side first and second arms, said left side arm group having left side first and second arms, wherein each of said first arms has: a connecting portion connected to each said wheel support member, and a support portion supported on the body of the vehicle, each of said first arms swinging about said support portion in conjunction with vertical motion of said wheel support member;

(B) a first central support member supported in a laterally displaceable state on a body of the vehicle; and (C) a second central support member swingably supported on the body at a predetermined position and connected to said first central support member, said first central support member being spaced in the vertical direction from the predetermined position of said second support member, and the predetermined position of said second central support member being spaced along the longitudinal direction of the vehicle from one of connecting portions connected to said first arms.

3. A suspension system for a vehicle having right and left side wheel support members supporting associated wheels located on either side of the vehicle, comprising:

(A) right and left side arm groups, said right side arm group having right side first and second arms, said left side arm group having left side first and second arms, said first arms and second arms being spaced along the longitudinal direction of the vehicle, each of said first arms having a connecting portion connected to each of said wheel support member, and a support portion supported on the body of the vehicle, each of said first arms swinging about said support portion in conjunction with vertical motion of said wheel support member;

(B) a first central support member supported in a laterally displaceable state on a body of the vehicle; and (C) a second central support member located between said first arms, swingably supported by said first central support member, the axis of swing extending in the longitudinal direction of the vehicle, and connected to said first arms, said first arms being swingable related to said second central support member at support portions, one of these support portions being spaced in the vertical direction from the axis of swing of said second central support member.

* * * * *